United States Patent
Johansson et al.

(10) Patent No.: US 8,327,613 B2
(45) Date of Patent: Dec. 11, 2012

(54) LAWN MOWER DECK

(75) Inventors: Jörgen Johansson, Jönköping (SE); Bengt Ahlund, Jönköping (SE); Norbert Rosenpek, Växjö (SE); Cecilia Niva, Jönköping (SE); Janarne Wetterheim, Jönköping (SE)

(73) Assignee: Husqvarna AB, Huskvarna (SE)

( * ) Notice: Subject to any disclaimer, the term of this patent is extended or adjusted under 35 U.S.C. 154(b) by 0 days.

(21) Appl. No.: 12/515,800

(22) PCT Filed: Nov. 22, 2006

(86) PCT No.: PCT/SE2006/001328
§ 371 (c)(1),
(2), (4) Date: Sep. 8, 2010

(87) PCT Pub. No.: WO2008/063105
PCT Pub. Date: May 29, 2008

(65) Prior Publication Data
US 2010/0319312 A1 Dec. 23, 2010

(51) Int. Cl.
*A01D 67/00* (2006.01)
(52) U.S. Cl. .................................................. 56/320.1
(58) Field of Classification Search ............... 56/320.2, 56/320.1, 255; D15/17, 27, 14
See application file for complete search history.

(56) References Cited

U.S. PATENT DOCUMENTS

| | | | |
|---|---|---|---|
| 3,568,421 A * | 3/1971 | Smith et al. | 56/255 |
| 3,680,295 A * | 8/1972 | Rutherford | 56/320.2 |
| 3,805,498 A * | 4/1974 | Armstrong | 56/17.5 |
| 4,083,168 A * | 4/1978 | Oscarsson | 56/320.2 |
| 4,280,319 A * | 7/1981 | Scanland | 56/255 |
| 4,711,077 A * | 12/1987 | Kutsukake et al. | 56/320.2 |
| 4,887,420 A * | 12/1989 | Cerny et al. | 56/320.2 |
| 4,899,526 A * | 2/1990 | Harris | 56/320.2 |
| D344,738 S * | 3/1994 | Young | D15/27 |
| 5,638,667 A * | 6/1997 | Ellson et al. | 56/320.1 |
| 5,638,668 A * | 6/1997 | Kallevig et al. | 56/320.1 |
| 5,884,466 A * | 3/1999 | Willmering et al. | 56/320.1 |
| D424,071 S * | 5/2000 | Bickford et al. | D15/17 |
| D458,613 S * | 6/2002 | Scott et al. | D15/14 |
| 6,481,194 B1 * | 11/2002 | Brewer et al. | 56/17.2 |
| D613,773 S * | 4/2010 | Colber et al. | D15/17 |
| 2002/0104706 A1 * | 8/2002 | Velke et al. | 180/333 |
| 2003/0163981 A1 * | 9/2003 | Osborne | 56/320.1 |
| 2009/0205306 A1 * | 8/2009 | Foster, III | 56/13.6 |

* cited by examiner

*Primary Examiner* — Arpad Fabian-Kovacs
(74) *Attorney, Agent, or Firm* — Christopher J. Knors; Moore & Van Allen PLLC

(57) ABSTRACT

A lawn mower deck may include a housing for a cutter and a protruding portion extending from a base of the housing. An attachment portion extends from the protruding portion back toward the housing and is fastened to the housing at a location separate from the protruding portion. The housing, the protruding portion and the attachment portion are formed from one piece of material.

23 Claims, 4 Drawing Sheets

LAWN MOWER DECK

TECHNICAL FIELD

The present document relates to lawn mower decks and methods for making lawn mower decks. In particular, the present document relates to a method for making a lawn mower deck as defined by the appended independent claims.

BACKGROUND

Components of conventional walk behind engine-driven lawn mowers include engine, rotary blade, wheels and handle. For security and grass collection reasons, the cutter, i.e. rotary blade, is arranged in a housing which is of essentially cylindrical shape.

The various components are mounted on a deck, i.e. the lawn mower chassis. On some lawn mower types, the cutter housing form part of an exposed or hidden deck, onto which external components, such as handle and wheels, are fastened.

A completed deck is usually provided with outer fastening surfaces that define suitable securing points for external components, and an inner surface that defines the cutting blade housing. The fastening surfaces for external components such as wheels and handle are often vertical for this purpose.

A common manufacturing method for lawn mower decks is to mould a sheet material into a suitable shape, by for example deep drawing.

According to a known manufacturing method, an external surface comprising the fastening surfaces is first formed from the sheet, and the cylinder shaped cutting blade housing is subsequently arranged inside by welding.

According to another known manufacturing method, the inner surface defining the housing is formed first, by form pressing a sheet blank, and the necessary outer fastening surfaces are provided subsequently. A known method for providing the fastening surfaces is to contour cut the sheet blank into a shape that includes both the form pressed housing, and flat surfaces which can be perpendicularly angled so as to form vertical fastening surfaces suitable for securing wheels and/or handle to the deck.

A lawn mower deck is subject to stress during use, especially at the securing points between the deck and wheels and/or handle. This puts the deck at risk for deformation and thus for malfunction.

To reduce this risk, it is known to reinforce a deck by arranging additional strengthening bars between the fastening surfaces and the cutter housing. The strengthening bars are usually welded to the deck, since this provides a more stable construction than does for example screwing.

The methods described above, however, suffer from several disadvantages.

Changing the shape of the sheet material, by for example form pressing, results in tensions in the material. Welding is associated with heating the material, which can release the tensions and cause deformation of the deck. Since, to make the lawn mower rest on all wheels, levelling of the wheels is crucial for the construction, even a slight change in the geometry of the deck might cause the wheel positions to be altered so that the deck must be rejected.

The need for welding extra components onto the sheet material also puts limitations as to what sheet material can be used. Galvanized sheet, for example, complicates welding, but would in many other aspects be well suited for the purpose of making a lawn mower deck. Moreover, galvanized sheet needs to be galvanized again after additional components have been fastened thereto by welding.

The need for fastening additional components also increases production costs, measured both in money, time and manufacturing complexity.

The additional components further result in problems with tolerances, because of long tolerance chains between different areas of the deck structure.

SUMMARY OF THE INVENTION

In view of the above, an objective is to present an improved and/or alternative method for making lawn mower decks. Also in view of the aforementioned respects of known lawn mower decks, it is an object to provide an improved and/or alternative lawn mower deck.

The present solution is based on the understanding that a one-piece reinforced deck structure can be formed from a sheet blank, without the need of fastening additional reinforcement parts between different portions of the deck.

The present solution is also based on the understanding that a lawn mower deck with a reinforcement structure integrated in the same sheet blank as the fastening surfaces and the housing allows of a more rational production and an increased torsional rigidity.

The object is wholly or partially achieved by a method for making a lawn mower deck and a lawn mower deck according to the respective independent claim.

According to a first aspect, there is provided a method for making a lawn mower deck, which method comprises providing a sheet blank of a mouldable material, forming in a housing portion of said sheet blank a housing for a cutter, cutting the sheet blank in a one-piece shape comprising the housing portion and a protruding portion, bending the protruding portion, so as to bring an attachment portion of said protruding portion in contact with said housing, and fastening said attachment portion to said housing.

By "mouldable material" is meant a sheet material, the shape of which can be changed by methods known in the art, such as for example deep drawing or form pressing. It is also understood that the material is rigid enough to be suited for the making of lawn mower decks.

By "housing portion" is meant a portion of the sheet blank which is provided for the purpose of forming a housing. This portion can be referred to as "housing portion" both before and after the housing is actually formed.

By "housing for a cutter" is meant a shape which provides a suitable cover for protecting a rotating blade. The housing may be provided with an open top end for the engine axis driving the cutter. The housing can have variations in its shape so as to make the cut of grass move in a desired manner, for example for facilitating collection thereof.

By "bending" is meant the action of changing the shape of the protruding portion, for example by twisting, rolling and/or folding. The action of bending may result in providing the protruding portion with sharp edges and/or rounded surfaces.

By "in contact with" is understood that the parts are close together. This does not exclude the presence of a small spacing means, such as a washer or plate, between the attachment portion and the housing.

A purpose of the protruding portion is to provide fastening areas for external components such as wheels and/or handles. These areas are exposed to stress during use, and the deck needs to be reinforced to provide a more stable construction. By bending the protruding portion so that an attachment portion thereof can be directly fastened to the housing, a more stable construction of the deck is achieved without extra components and operations, such as fastening a bracing bar between the housing and the protruding portion. This provides for the making of a lawn mower deck without welding extra reinforcement parts to the deck and thus does not put the deck at risk of deformation due to heating. It also allows the use of materials which are not suitable for welding, such as galvanized sheet. The method also enables the use of lacquered sheet blanks.

Integrated reinforcement increases the torsional rigidity of the deck. Since not having to fasten extra reinforcement to the deck results in shorter tolerance chains between different areas of the deck structure, the risk of for example unlevelled wheel positions is further reduced.

The attachment portion may be an end portion.

The forming of the housing may be achieved by deep drawing. Deep drawing is a well-known technique for shaping sheet material, which technique is usable for many materials suitable for making lawn mower decks, such as for example black steel, stainless steel, galvanized sheet. Furthermore, deep drawing presses are often arranged to carry out a series of operations, and the same form pressing machinery may thus be used to perform both said deep drawing to form the housing, as well as one or more of the contour cutting, bending and fastening operations. This allows of a rationalization of the production.

The fastening of the attachment portion to the housing may comprise pressing the attachment portion to the housing, so as to form a locking mechanism in the sheet blank itself. Thus, fastening of the attachment portion to the housing may be performed without adding extra components, by for example TOX joint riveting. An advantage with such fastening methods is that they can be carried out in for example a deep draw press, which, as already mentioned, may be arranged to carry out one or more of the other necessary operations according to the method. This would enable making a complete deck structure in a single pressing machinery.

Furthermore, by not adding extra components such as screws to the sheet blank, its surface can be kept intact, thus protecting the material from corrosion.

The sheet blank can be sheet metal. Suitable metals include sheet steel.

The bending can comprise making a first fold so as to provide the protruding portion with a substantially vertical portion, and making a second fold between said first fold and a free end portion of the protruding portion so as to provide the protruding portion 3 with an attachment portion.

A vertical area facilitates fastening for example the wheels and handle of the lawn mower to the deck. A securing point for external parts such as wheels and handles further allows for more secure fastening when defined on a vertical area.

According to a second aspect, a lawn mower deck is provided, comprising a housing for a cutter, and a protruding portion, which protruding portion is bent such that an attachment portion thereof is in contact with said housing, wherein said attachment portion is fastened to said housing, and wherein said housing and said protruding portion are formed in one piece.

The attachment portion may be an end portion.

The attachment portion may be substantially horizontal.

The protruding portion may present a base portion and a substantially vertical portion arranged between said base portion and said attachment portion.

The protruding portion may present a pair of substantially vertical portions, each being associated with a respective attachment portion.

The pair of vertical portions may be substantially symmetrically arranged about a longitudinal axis L of the lawn mower deck.

The pair of protruding portions, may be spaced apart in a longitudinal direction of the lawn mower deck.

The respective attachment portions can be fastened to said housing at a respective securing point.

The securing points may between them define a substantially rectangular shape. This can result in the attachment portions forming an X-shape when viewed from above. Such a structure provides a good reinforcement of the deck and symmetrical securing points for the wheels and the handle of the lawn mower, while constituting a pleasant design.

According to a third aspect, a lawn mower is provided, which comprises a deck according to any of the embodiments described above.

Generally, all terms used in the claims are to be interpreted according to their ordinary meaning in the technical field, unless explicitly defined otherwise herein. All references to "a/an/the [element, device, component, means, step, etc]" are to be interpreted openly as referring to at least one instance of said element, device, component, means, step, etc., unless explicitly stated otherwise. The steps of any method disclosed herein do not have to be performed in the exact order disclosed, unless explicitly stated.

Other objectives, features and advantages of the present solution will appear from the following detailed disclosure, from the attached dependent claims as well as from the drawings.

BRIEF DESCRIPTION OF THE DRAWINGS

The above, as well as additional objects, features and advantages of the solution, will be better understood through the following illustrative and non-limiting detailed description of an embodiment with reference to the appended drawings, where the same reference numerals will be used for similar elements, wherein.

DETAILED DESCRIPTION OF AN EMBODIMENT

Figure 1:
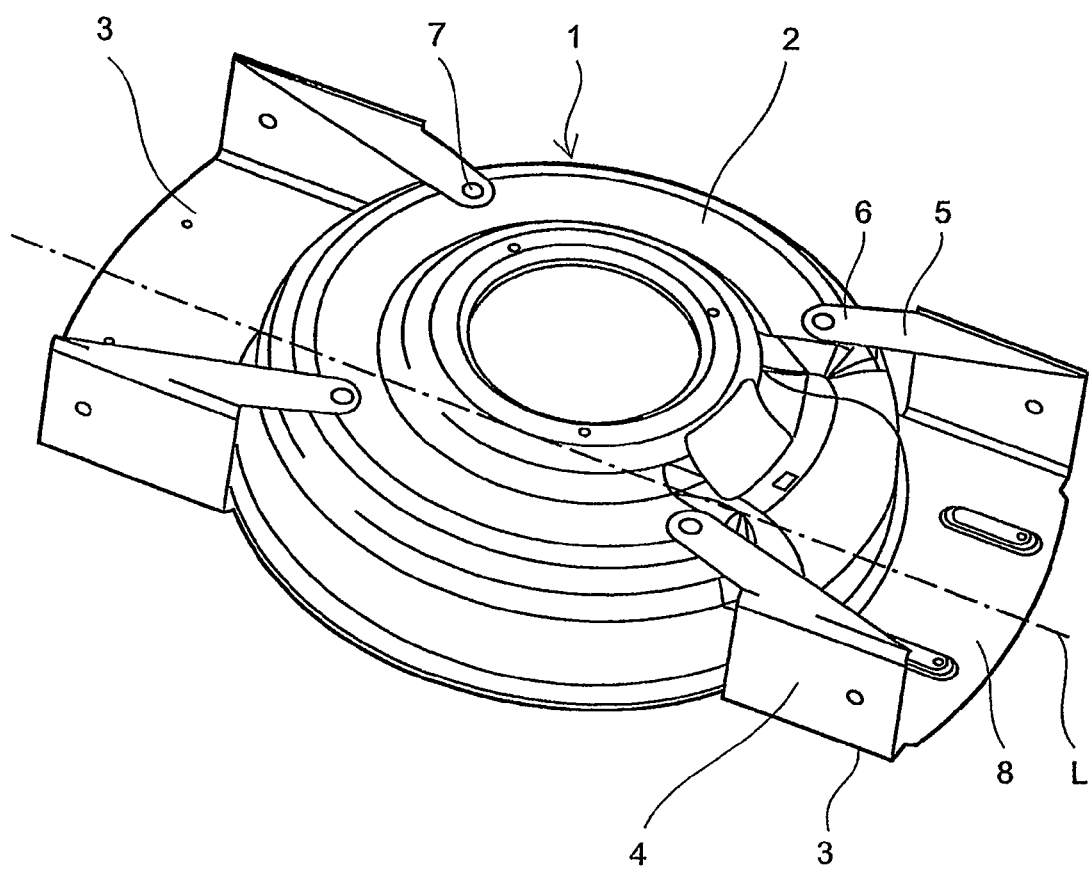
FIG. 1 shows, in a perspective view, a lawn mower deck made according to the present solution.
Figure 2:
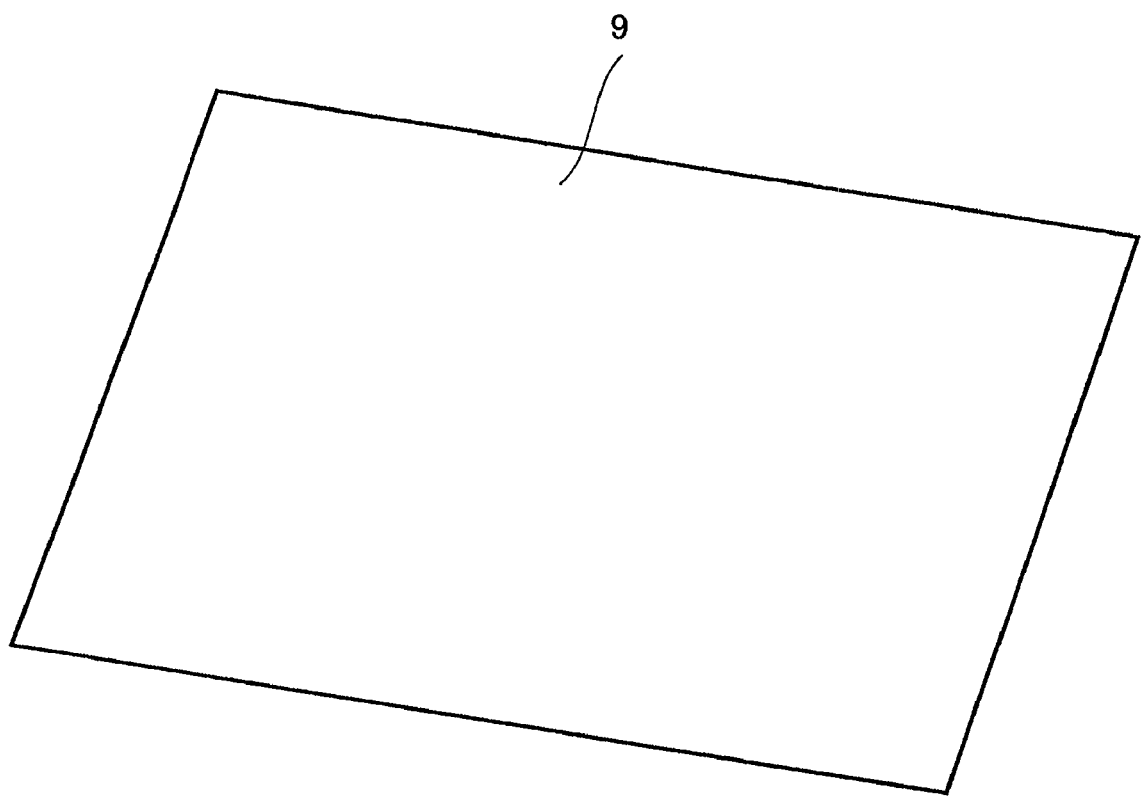
FIG. 2 shows, in a perspective view, a sheet blank, provided for the purpose of making a lawn mower deck.
Figure 3:
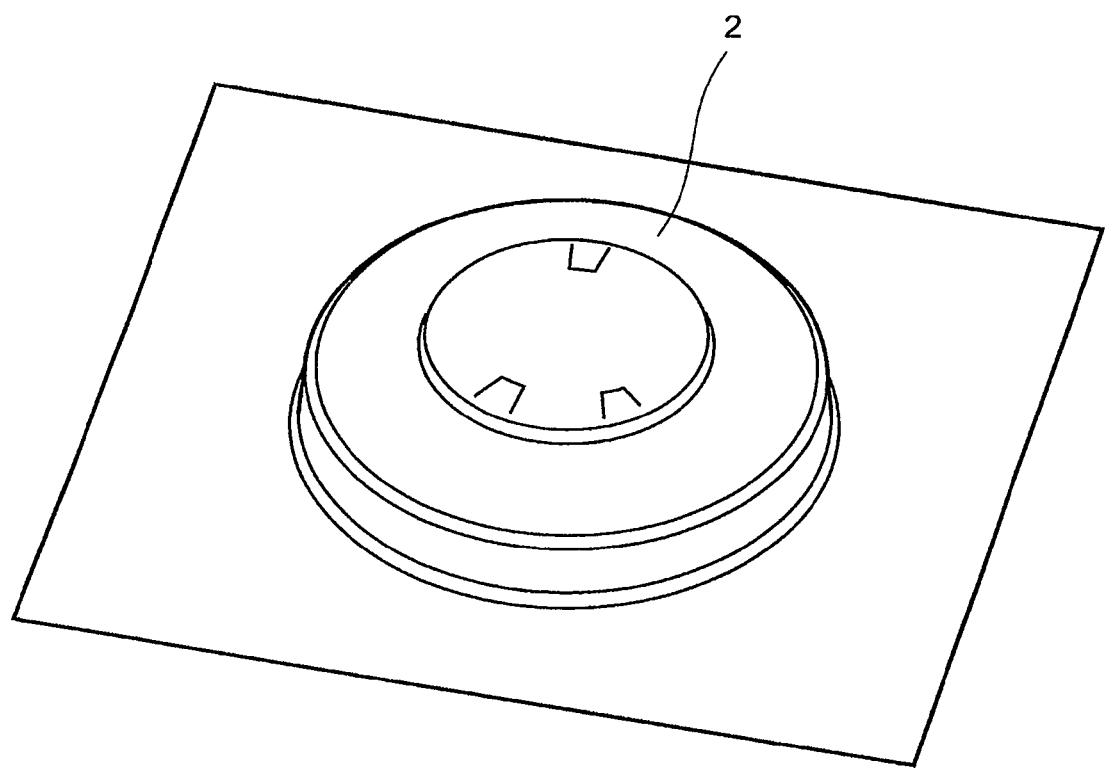
FIG. 3 shows, in a perspective view, a sheet blank in which a housing for a cutter has been formed.
Figure 4:
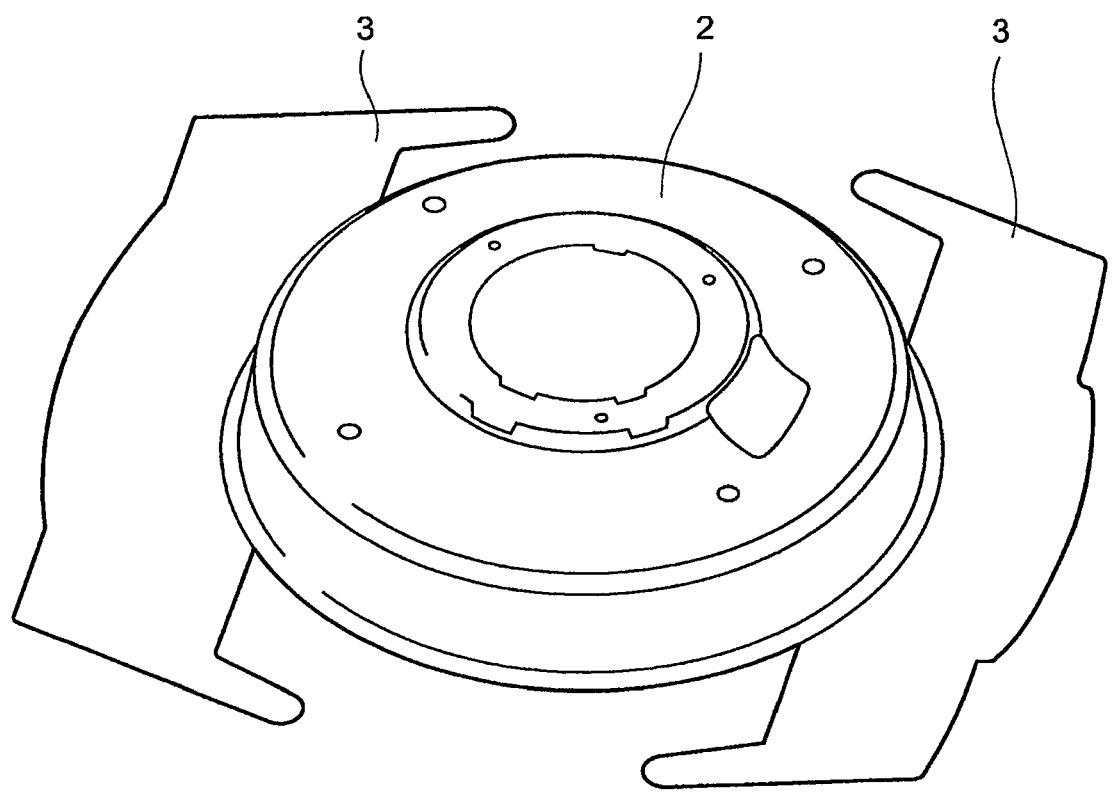
FIG. 4 shows, in a perspective view, a sheet blank which has been cut in a one-piece shape comprising a housing for a cutter, and two protruding portions.

FIG. 1 shows an embodiment of a lawn mower deck 1 according to the present solution. The deck 1 comprises a steel sheet blank 9, as seen in FIG. 2, which has been deep drawn to define a housing 2 for a cutter, as seen in FIG. 3. The sheet blank 9 has then been contour cut into a one-piece shape comprising the housing 2 and two protruding portions 3, as seen in FIG. 4. Each of the protruding portions 3 has then been bent in a first folding operation, so as to form a base portion 8 and two vertical portions 4 each, and in a second folding operation so as to form two substantially horizontal attachment portions 5 each. The four attachment portions 5 thus formed out of the sheet blank 9 each comprise a free end portion 6. The folding operations have been carried out so as to bring the four free end portions 6 into contact with the housing 2. The free end portions 6 have then been fastened to the housing 2, at respective securing points 7, by TOX joint riveting. The pairs of vertical portions 4 are substantially symmetrically arranged about a longitudinal axis (L) of the lawn mower deck and the two protruding portions 3 are spaced apart in a longitudinal direction of the lawn mower deck, arranged on opposite sides of the housing 2.

This construction provides a stable deck structure with integrated reinforcement. The four securing points 7 between them define a rectangle. The X-shape thus formed by the horizontal attachment portions 5 when seen from above, constitutes a reinforcement geometry with acknowledged stabilising properties. The four vertical portions 4 are well suited for the fastening of external components such as wheels and handle to the deck.

The attachment portions 5, could in one embodiment be slanting. They may also have a curved surface.

In yet another embodiment the securing points 7 do not define a rectangle between them. The attachment areas 5 may constitute an irregular X-shape, while still providing good reinforcement structure.

In yet another embodiment only one of the protruding portions 3 as seen in FIG. 1 is provided.

The sheet blank 9 can be a metallic material, such as for example sheet steel, galvanized sheet, stainless steel or aluminium. The surface of the sheet blank 9 can be uncoated or coated with for example lacquer.

In one embodiment the sheet blank 9 can be a plastic material, and the forming of the housing 2 can be achieved by moulding.

The housing 2 can be provided with any suitable shape for covering lawn mower cutters such as one or more rotating blades. It can be substantially cylindrical. It can have a shape which is designed to make the grass behave in a desired way, and to facilitate collection thereof.

The deck can be provided with one or more protruding portions 3. A protruding portion 3 can have one or more free ends 6, of which one or more can be bent so as to be brought into contact with the housing 2.

In the embodiment seen in FIG. 1, the protruding portions 3 protrude from the base of the housing 2. In another embodiment a protruding portion 3 could protrude from an area of side of the housing 2, which area is spaced apart from the base of the housing 2.

The protruding portion 3 can be fastened to any suitable portion of the housing 2. The attachment portion 5 may be an end portion 6. If the attachment portion 5 is not an end portion, the end portion 6 may be formed to be in contact with the housing or to be bent away from the housing.

In the embodiment shown in FIG. 1, the end portions 6 of the attachment portions 5 are fastened to the top side of the housing 2. In another embodiment one or more attachment portions 5 can be fastened to the side of the housing 2. In one embodiment an attachment portion 5 may be substantially vertical.

The attachment portion 5 and housing 2 can be in direct contact with each other at a securing point 7, or separated by a small spacer, such as a plate or washer. The fastening can be done by punching, riveting, screwing, or any other suitable method known in the art. In one embodiment, the fastening of the attachment portion 5 to the housing 2 could be done by welding. Such a construction would still benefit from increased torsional rigidity and reduced tolerance chains as compared to a deck construction with separate reinforcement components fastened to the deck.

The operation of fastening can be such that the sheet material portions are fastened to each other, without the need of adding extra components such as screws to the construction. One possible such method is TOX joint riveting.

A combination of different fastening methods can be used.

The bending operation can comprise rolling the protruding portion, so as to create a curved portion thereof. The bending operation can comprise folding so as to create angles in the shape of the protruding portion. The bending may comprise combinations of rolling, folding and twisting.

The various operations can be carried out in the same machines or in different machines. Two or more operations may be carried out in a deep drawing press.

In one embodiment the deck comprises reinforcement according to the present solution only at the rear part of the deck. In another embodiment reinforcement according to the solution is provided only at the front part of the deck.

The solution has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A lawn mower deck, comprising:
   a single, one-piece sheet blank, the single, one-piece sheet blank having formed therein:
   a housing for a cutter;
   at least one protruding portion extending from a base of said housing, each of said at least one protruding portion having a base portion and at least one vertical portion, each of said vertical portion bent to extend substantially vertically from said base portion; and
   an attachment portion bent substantially horizontal from each of said at least one vertical portion and extending from said vertical portion toward said housing, said attachment portion fastenable to said housing,
   wherein said housing, said at least one protruding portion, and said attachment portion are formed without fastening from the single, one-piece sheet blank.

2. The lawn mower deck according to claim 1, wherein said attachment portion terminates in an end portion.

3. The lawn mower deck according to claim 1, wherein said housing, said at least one protruding portion, and said attachment portion are formed directly by drawing or bending of the single, one-piece sheet blank.

4. The lawn mower deck according to claim 1, wherein each of said protruding portion has a pair of substantially vertical portions, each being associated with a respective attachment portion.

5. The lawn mower deck according to claim 4, wherein said pair of vertical portions are substantially symmetrically arranged about a longitudinal axis of the lawn mower deck.

6. The lawn mower deck according to claim 4, wherein a pair of protruding portions are spaced apart in a longitudinal direction of the lawn mower deck.

7. The lawn mower deck according to claim 4, wherein the respective attachment portions are fastened to said housing at a respective securing point without welding or screws.

8. The lawn mower deck according to claim 7, wherein said securing points between them define a substantially rectangular shape.

9. A lawn mower comprising a deck according claim 8.

10. The lawn mower deck of claim 1, wherein the single, one piece sheet blank is galvanized metal.

11. The lawn mower deck of claim 1, wherein the attachment portion is substantially parallel to the base portion of the at least one protruding portion.

12. A lawn mower comprising:
   a lawn mower deck, the lawn mower deck comprising:
   a single, one-piece galvanized sheet metal blank, the blank having formed therein:

a housing for a cutter;
at least one protruding portion extending from a base of said housing, wherein each of said at least one protruding portion a base portion and at least one vertical portion, said at least one vertical portion bent to extend substantially vertically from said base portion; and
an attachment portion bent substantially horizontal from each of said at least one vertical portion and extending from said respective vertical portion toward said housing,
wherein said housing, said at least one protruding portion, and each said attachment portion are formed directly from the blank without fastening.

13. The lawn mower according to claim 12, wherein said each attachment portion terminates in an end portion.

14. The lawn mower according to claim 12, wherein said at least one protruding portion comprises a pair of substantially vertical portions, each being associated with a respective attachment portion.

15. The lawn mower according to claim 14, wherein said pair of vertical portions are substantially symmetrically arranged about a longitudinal axis of the lawn mower deck.

16. The lawn mower according to claim 14, wherein said pair of protruding portions are spaced apart in a longitudinal direction of the lawn mower deck.

17. The lawn mower deck of claim 12, wherein said attachment portion is fastened to said housing without welding or screws.

18. A method for making a lawn mower deck, the method comprises:
providing a single sheet blank of a mouldable material;
forming in said single sheet blank, a housing for a cutter;
cutting at least one protruding portion in said single sheet blank, each of said at least one protruding portion extending from said housing along a longitudinal axis;
bending each of said at least one protruding portion, wherein the bending comprises:
(i) making a substantially vertical fold in said at least one protruding portion relative to said longitudinal axis; and
(ii) making a substantially horizontal fold between said vertical fold and a free end portion of said at least one protruding portion relative to said longitudinal axis,
wherein said free end portion of each of said at least one protruding portion extends towards said housing and is configured for fastening to said housing.

19. The method according to claim 18, wherein the housing is formed by deep drawing the sheet blank.

20. The method according to claim 18, further comprising fastening to said housing said end portion of said at least one substantially horizontal attachment portion.

21. The method according to claim 18, wherein said sheet blank is galvanized sheet metal.

22. The method according to claim 21, wherein said fastening is without screws or welding, wherein said end portion is pressed into the housing forming a locking mechanism between said end portion and said housing.

23. The method according to claim 20, wherein the arrangement of said end portions provides an x-shape reinforcing geometry in said lawn mower deck.

* * * * *